April 7, 1959 J. M. D. DEKKER ET AL 2,881,262

CARRIER-WAVE TELEPHONY SYSTEM

Filed April 26, 1954

INVENTOR.
Jan Maurits Douwes Dekker
Hans Feiner
BY
Agent

United States Patent Office 2,881,262

Patented Apr. 7, 1959

2,881,262

CARRIER-WAVE TELEPHONY SYSTEM

Jan Maurits Douwes Dekker, The Hague, and Hans Feiner, Eindhoven, Netherlands, assignors, by mesne assignments, to North American Philips Company, Inc., New York, N.Y., a corporation of Delaware Application April 26, 1954, Serial No. 425,628

Claims priority, application Netherlands April 27, 1953

6 Claims. (Cl. 179—78)

Figure 1:
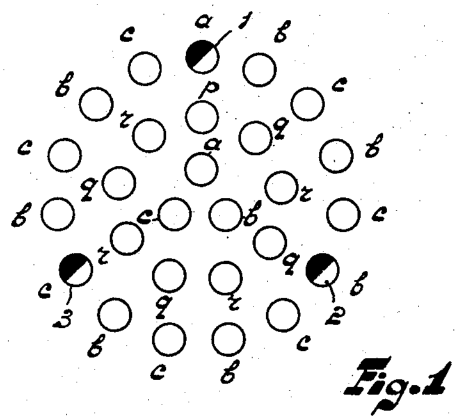

The invention relates to a carrier-wave telephone system for the transmission of telephone signals through suitable pairs of wires of a cable for voice-frequency telephony, in which corresponding pairs of wires of the successive manufactured lengths of the cable are connected to one another.

It is known that in many telephone circuits there are still cables having a large number of wire pairs, these cables being intended for voice-frequency telephony and used to this end. Usually, in these cables the corresponding pairs of wires of the successive manufactured lengths of the cable are connected to one another.

If between two population centers between which such a cable exists the need for telephone circuits increases, there may be made a choice either of providing a new cable between these centers, this cable being chosen to be such that it permits carrier-wave telephone communication, or of making a number of pairs of wires of the existing cable suitable for carrier-wave telephony. In the latter case, if the pairs of wires include, as usual, loading-coils, it will be necessary to remove these loading-coils.

We have then to face the problem of which pairs and how many of them must be rendered suitable for carrier-wave frequency transmission in order to obtain a maximum number of carrier-wave telephone channels with satisfactory transmission properties. The most important transmission property which should be considered in this case, is the amount of cross talk liable to occur, the far-end cross talk being in this case of particular importance for most carrier-wave telephone systems. If there is a particular requirement with respect to far-end cross talk in conjunction with a particular length of the transmission path, the maximum frequency transmissible through a pair of wires must be determined, in accordance with the properties of this pair, and hence, at a given bandwidth of a telephone channel and a given frequency separation between the channels, the number of telephone channels to be transmitted through this pair of wires is determined.

It is therefore necessary to determine by measurements which pairs are most suitable for carrier-wave operation. However, hitherto there has been a hesitation in rendering wire pairs of voice-frequency telephone cables suitable for carrier-wave telephony. To this end arbitrary pairs had to be withdrawn from the busy telephone exchange in order to carry out the required measurements. If it is found that no satisfactory results are obtained, other wire pairs must again be withdrawn from the telephone communications and the pairs measured.

As stated above, the loading-coils must as a rule be removed or, if the measuring results are bad, they must be replaced.

The applicants have now found that it is possible to indicate beforehand which wire pairs should be preferably adapted to carrier-wave telephone operation, so that measurements for finding out these wire pairs are unnecessary. As will be evident hereinafter, it is also possible, if the number of most suitable wire pairs has been determined and if there is a need for a larger number of telephone channels than these pairs can transmit, to give further indications about the wire pairs to be preferably used thereafter.

The carrier-wave telephone system according to the invention has the feature that the carrier-wave frequency transmission is carried out in the first place through those wire pairs which have relatively different twist lengths and are approximately the maximum distance from one another and which are located in the outer layer in cables having three layers and in the next to the outer layer or the next to the inner layer, in cables having more than three layers.

If the maximum number of channels is arranged in the number of wire pairs thus determined, it is found that the next extension of the number of channels is obtained by relative balancing of these wire pairs. If the wire pairs thus balanced are completely occupied by the possible carrier-wave channels, further exptension of the number of channels, in accordance with a further embodiment, is obtained by having the transmission carried out also through wire pairs of a further inward layer of the cable, the wire pairs of this inner layer having twist lengths differing from the wire pairs of the outer layer, the wire pairs of the inner layer having relatively different twist lengths and being approximately the maximum relative distance from one another, all wire pairs used being balanced relative to one another.

If even this transmission possibility is exhausted, and if the cable is composed of quads, the transmission is carried out, in accordance with the invention, not only through the said wire pairs but also through the second pairs of the relative quads and all wire pairs used are balanced relative to one another.

Figure 2:
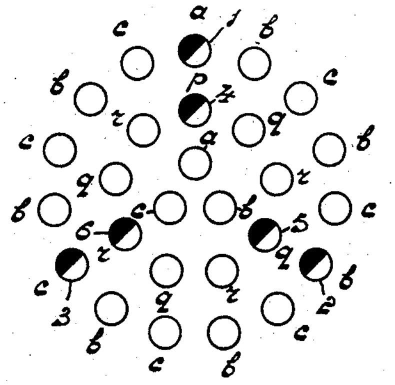
Figure 4:
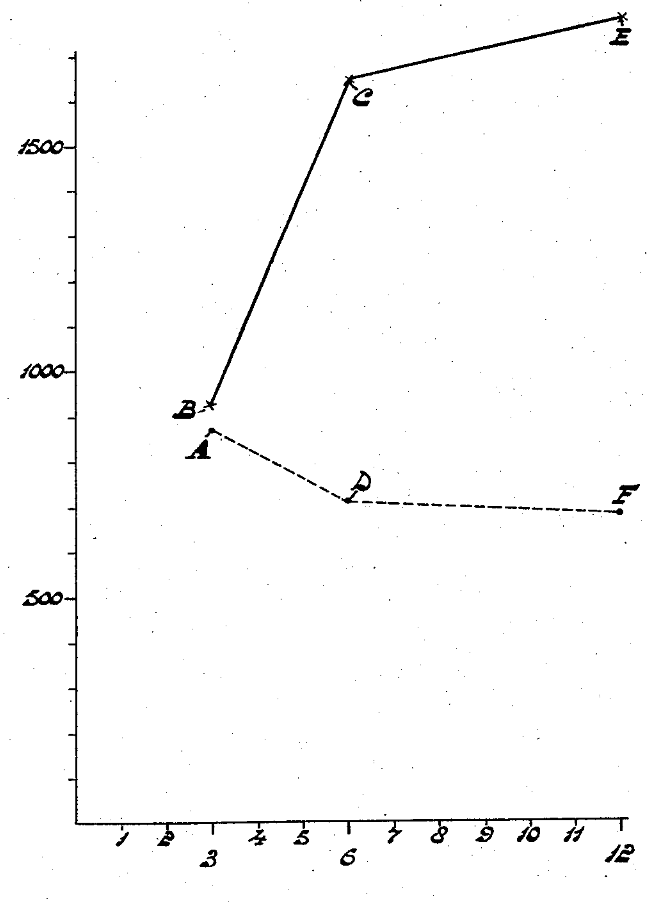
Figure 3:
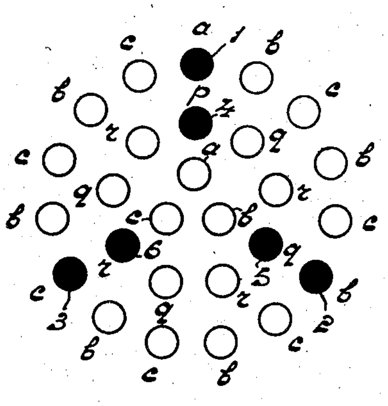

The carrier-wave telephone system according to the invention will be explained more fully with reference to the drawing, in which Figs. 1, 2 and 3 show diagrammatically sectional views of a cable composed of quads; in the figures it is indicated which wire pairs or quads are used for the carrier-wave frequency transmission and Fig. 4 shows which bandwidth becomes available for carrier-wave telephone transmission when using the systems shown in Figs. 1, 2 or 3.

The cable, the sectional area of which is shown in Figs. 1, 2 and 3, is composed of three layers of quads. The layers each comprise an odd number of quads, so that each layer has three different twist lengths for the quads. The outer layer, for example, comprises 15 quads, of which one quad has the twist length *a*, seven have the twist length *b* and seven the twist length *c*. Quads lying side by side in the layers have different twist lengths.

The central layer comprises 9 quads, of which one has the twist length *p*, four have the twist length *q* and four the twist length *r*, quads lying side by side having different twist lengths.

The inner layer comprises finally three quads having the twist lengths *a*, *b* and *c*.

With such a cable, as is indicated in Fig. 1, in the first place a wire pair of the quad 1 having the twist length *a*, a wire pair of the quad 2 having the twist length *b* and a wire pair of the quad 3 having the twist length *c* of the outer layer are preferably rendered suitable for carrier-wave telephone communication.

For the sake of clearness the use of only one wire pair of a quad is indicated in the figure by a black half; it should, however, be considered that, as is known, the wires of a wire pair in a quad are located diametrically opposite one another.

Consequently in the system shown in Fig. 1 three wire pairs of the cable are used. No balancing has yet been carried out.

In Fig. 4 the number of wire pairs used for carrier-wave communication is plotted on the horizontal axis, whereas the total bandwidth for carrier-wave telephony is plotted on the vertical axis. With a particular cable, in which use was made of three wire pairs in the manner shown in Fig. 1, it was found that per wire pair 290 kc./s. became available, so that in total 3×290=870 kc./s. could be used for carrier-wave communication. This corresponds to point A in Fig. 4.

If the bandwidth obtained is not sufficient, it could be considered to adapt a further number of wire pairs for carrier-wave communication. It is then found, however, that it is more advantageous to first balance the wire pairs so far adapted relative to one another, so that a bandwidth of 3×308=924 kc./s. becomes available, as is indicated at point B in Fig. 4.

In order to obtain a larger number of channels, use is then made of three wire pairs of the next inner layer of the cable, as is shown in Fig. 2. One wire pair of the quad 4 having the twist length *p*, one wire pair of the quad 5 having the twist length *q* and one wire pair of the quad 6 having the twist length *r* are chosen.

These twist lengths differ from one another and from those of the wire pairs of the outer layer. The quads 4, 5 and 6 have the maximum distance from one another in their layer. The six wire pairs chosen are balanced relatively to one another. In this case *b* it was found that per wire pair a bandwidth of 274 kc./s. became available, in total 6×274=1644 kc./s., indicated at point C in Fig. 4. At D it is indicated which bandwidth becomes available with the same choice of wire pairs, however without balancing.

If it is desired to extend still further the carrier-wave communication, the further wire pairs of the quads already half occupied by carrier-wave communication are adapted to carrier-wave communication, as is indicated in Fig. 3 by completely black sections. Then twelve wire pairs are available and it is found that per wire pair a bandwidth of 148 kc./s. becomes available, so that in total 12×148=1776 kc./s. is attained, as is indicated in Fig. 4 by point E. In this case balancing is also carried out; otherwise a considerably smaller bandwidth, indicated by point F, is obtained.

It seems reasonable to assume that further extension of the carrier-wave telephone communication is possible by rendering further wire pairs suitable for this communication.

However, it is found that then the far-end cross talk increases, so that with the same requirement for cross talk damping the maximum frequency in each of the wire pairs must be reduced to such an extent that the quotient in the number of wire pairs and the bandwidth per wire pair is lower than in the case shown in Fig. 3 and at point E in Fig. 4, so that further extension is not useful.

With relative balancing of the wire pairs used the points B, C and E of Fig. 4 are followed; in these cases the bandwidth per wire pair is found to decrease from 308 to 274 and to 148 kc./s. The fact that further addition of wire pairs is useless is moreover illustrated by the case of non-balancing, i.e. on the line ADF in Fig. 4. With three wire pairs, point A, more carrier-wave channels may be used than with six or twelve wire pairs (point D and point F respectively).

What is claimed is:

1. A voice-frequency telephone cable system adapted for carrier-wave telephony, comprising a multi-layer cable in which each layer has a plurality of pairs of wires, at least two of said pairs of wires being used for carrier-wave telephony and the remaining said pairs of wires being used for communication other than carrier-wave telephony, the wires of said pairs used for carrier-wave telephony being twisted and having different twist lengths and being relatively spaced apart approximately the maximum distance from one another in said cable.

2. A system in accordance with claim 1, in which said cable comprises three layers, and in which said pairs of wires used for carrier-wave telephony are in the outer one of said layers.

3. A system in accordance with claim 1, in which said cable comprises more than three layers, and in which said pairs of wires used for carrier-wave telephony are in a layer which is next to the outer layer.

4. A system in accordance with claim 1, in which said last-named pairs of wires are symmetrically balanced relative to one another.

5. A system in accordance with claim 1, in which said pairs of wires used for carrier-wave telephony are in the outer layer of said cable, at least two pairs of wires in the next to the outer layer of said cable being used for carrier-wave telephony, the wires of the last-mentioned pairs being twisted and having different twist lengths with respect to each other and with respect to said pairs of wires used for carrier-wave telephony in the outer layer, said pairs of wires used for carrier-wave telephony in the next to the outer layer being spaced apart approximately the maximal distance from one another in said next to the outer layer.

6. A system in accordance with claim 5, in which each said layer comprises a plurality of quads, said pairs of wires used for carrier-wave telephony being included in different quads, the second pairs of wires in said different quads being used for carrier-wave telephony.

References Cited in the file of this patent

UNITED STATES PATENTS

| | | |
|---|---|---|
| 1,726,551 | Ford | Sept. 3, 1929 |
| 2,072,712 | Fischer | Mar. 2, 1937 |